US008438349B2

(12) United States Patent
Olson et al.

(10) Patent No.: US 8,438,349 B2
(45) Date of Patent: May 7, 2013

(54) PROXY BACKUP OF VIRTUAL DISK IMAGE FILES ON NAS DEVICES

(75) Inventors: James Robert Olson, Afton, MN (US); Timothy M. Naftel, Longmont, CO (US); David Teater, Minneapolis, MN (US); Sinh D. Nguyen, Eden Prairie, MN (US); James P. Ohr, Saint Paul, MN (US)

(73) Assignee: Symantec Corporation, Mountain View, CA (US)

( * ) Notice: Subject to any disclaimer, the term of this patent is extended or adjusted under 35 U.S.C. 154(b) by 678 days.

(21) Appl. No.: 12/545,450

(22) Filed: Aug. 21, 2009

(65) Prior Publication Data

US 2011/0047340 A1  Feb. 24, 2011

(51) Int. Cl.
*G06F 13/00* (2006.01)
*G06F 13/28* (2006.01)
*G06F 9/455* (2006.01)

(52) U.S. Cl.
USPC ............ 711/162; 711/161; 711/E12.103; 718/1

(58) Field of Classification Search .......... None
See application file for complete search history.

(56) References Cited

U.S. PATENT DOCUMENTS

| 7,093,086 | B1 * | 8/2006 | van Rietschote | 711/161 |
| 7,370,164 | B1 * | 5/2008 | Nagarkar et al. | 711/162 |
| 7,669,020 | B1 | 2/2010 | Shah | |
| 2007/0244938 | A1 * | 10/2007 | Michael et al. | 707/204 |
| 2009/0313447 | A1 | 12/2009 | Nguyen | |
| 2010/0011178 | A1 | 1/2010 | Feathergill | |
| 2010/0049930 | A1 | 2/2010 | Pershin | |

FOREIGN PATENT DOCUMENTS

GB  2445105  6/2008

OTHER PUBLICATIONS

International Search Report in application No. PCT/US2010/045141 mailed Feb. 9, 2011.
U.S. Appl. No. 11/824,478, entitled "Method and Apparatus for Mapping Virtual Drives", filed Jun. 29, 2007.

* cited by examiner

*Primary Examiner* — Reginald Bragdon
*Assistant Examiner* — Eric S Cardwell
(74) *Attorney, Agent, or Firm* — Meyertons, Hood, Kivlin, Kowert & Goetzel, P.C.

(57) ABSTRACT

A system and method for backing up a virtual machine executing on a virtualization server computer are described. A snapshot of a virtual disk image file of the virtual machine may be created on a network-attached storage (NAS) device coupled to the virtualization server computer. The snapshot may be used to backup the virtual disk image file from the NAS device to a backup storage device without transferring the virtual disk image file through the virtualization server computer. Mapping information useable to access the plurality of files stored in the virtual disk image file on an individual basis may be created and stored together with the backup copy of the virtual disk image file on the backup storage device.

16 Claims, 6 Drawing Sheets

PROXY BACKUP OF VIRTUAL DISK IMAGE FILES ON NAS DEVICES

BACKGROUND OF THE INVENTION

1. Field of the Invention

This invention relates to data backup software for computer systems. More particularly, the invention relates to a system and method for backing up a virtual disk image file used by a virtual machine.

2. Description of the Related Art

A virtual machine (VM), also referred to as a virtual computer, is a software implementation of a machine (computer) that executes programs like a real machine. Virtualization provides the ability for multiple virtual machines to run together on the same physical computer. Each virtual machine may execute its own operating system and may appear to a user of the virtual machine to be the same as an independent physical computer. The software layer that executes on the physical computer and manages the various virtual machines is called a hypervisor or virtual machine host software. The virtual machine host software can run on bare hardware (called a Type 1 or native VM) or under control of an operating system (called a Type 2 or hosted VM).

A user may interact with a virtual machine similarly as if the user were interacting with a physical computer. For example, various software applications may be installed on the virtual machine, and the virtual machine may enable the user to launch the software applications, provide input to the software applications, and view output from the software applications identically as if they were executing on a physical computer.

Just as a physical computer system uses files, a virtual machine also uses various files, such as operating system files, application software files, data files, etc. It is often necessary or desirable to backup the files used by a virtual machine. Backing up the files of the virtual machine helps to protect against data loss and corruption and also enables a previous state of the virtual machine to be recovered if necessary, e.g., to roll back the virtual machine to a state as it existed at a previous point in time.

SUMMARY

Various embodiments of a system and method for backing up a virtual machine executing on a virtualization server computer are described herein. Some embodiments of the method may comprise requesting a snapshot of a virtual disk image file of the virtual machine to be created on a network-attached storage (NAS) device coupled to the virtualization server computer. The virtual disk image file may store a plurality of files used by the virtual machine. The method may further comprise receiving access information useable to access the snapshot on the NAS device, and using the snapshot to backup the virtual disk image file from the NAS device to a backup storage device without transferring the virtual disk image file through the virtualization server computer.

In some embodiments, the method may be implemented by backup software executing on a proxy backup server computer system. The backup software may communicate with the NAS device to transfer data of the snapshot to the proxy backup server computer system, and may communicate with the backup storage device to forward the data from the proxy backup server computer system to the backup storage device. In other embodiments the backup software may communicate with the NAS device to cause the NAS device to transfer data of the snapshot directly to the backup storage device without transferring the data through the proxy backup server computer system.

Further embodiments of the method may comprise creating mapping information useable to access the plurality of files stored in the virtual disk image file on an individual basis. For each respective file of the plurality of files, the mapping information may specify a location of the respective file within the virtual disk image file. The mapping information may be stored on the backup storage device. Subsequently to backing up the virtual disk image file and storing the mapping information, a request to restore a particular file of the plurality of files from the virtual disk image file on the backup storage device to a particular computer system may be received. In response to the request to restore the particular file, the mapping information may be accessed to determine the location information specifying the location of the particular file within the virtual disk image file on the backup storage device. The particular file may then be extracted from the virtual disk image file on the backup storage device using the location information, and may be transferred to the particular computer system which requested the file to be restored.

In an alternative embodiment of the method, a virtual machine executing on a virtualization server computer may be backed up by requesting a first snapshot of a virtual disk image file of the virtual machine to be created within a file system volume stored on a network-attached storage (NAS) device coupled to the virtualization server computer. A second snapshot of the file system volume may then be created on the NAS device. Access information useable to access the second snapshot on the NAS device may be received in response to requesting the second snapshot to be created. The second snapshot may then be used to backup the virtual disk image file from the NAS device to a backup storage device without transferring the data through the virtualization server computer.

BRIEF DESCRIPTION OF THE DRAWINGS

A better understanding of the invention can be obtained when the following detailed description is considered in conjunction with the following drawings, in which.

Figure 1:
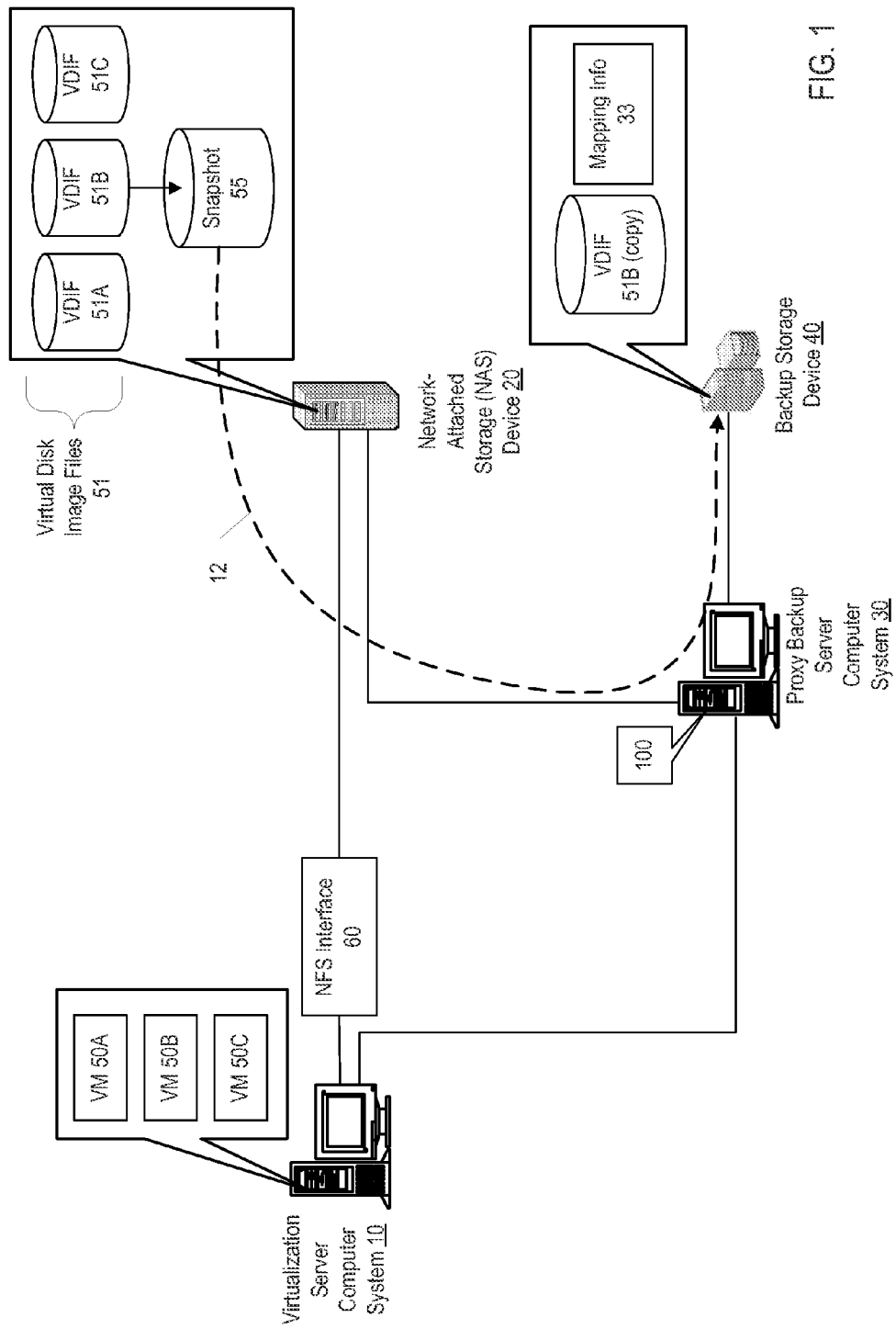
FIG. 1 illustrates a system for backing up a virtual disk image file of a virtual machine.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for backing up a virtual disk image file are described herein. FIG. 1 illustrates one embodiment of the system. A virtualization server computer system 10 executes one or more virtual machines 50, e.g., the virtual machines 50A, 50B and 50C in this example. In various embodiments the virtual machines 50 may execute within any particular virtualization platform. As one example, the virtualization platform software may be provided by VMWare, Inc.

Each virtual machine 50 may maintain its own set of files, similarly as a physical computer would, such as operating system files, application program files, data files, etc. Whereas the files of a physical computer are typically stored on a hard disk, the files of each virtual machine 50 may be stored in one or more virtual disk image files. A virtual disk image file represents the contents and structure of a hard disk drive, e.g., by representing disk sectors. Sectors of the virtual disk image file are allocated as necessary for storing the files used by the virtual machine. In addition to the sector data, the virtual disk image file also includes various data structures for managing the sector data, such as a sector bitmap indicating which sectors are currently in use and store valid data. A virtual disk image file may be formatted according to a particular specification. Virtual disk image file specifications in common use include the Virtual Hard Disk (VHD) format and the Virtual Machine Disk Format (VMDK) format.

In the example of FIG. 1, virtual disk image files 51 which store the files used by the virtual machines 50 are stored separately from the virtualization server computer system 10 on a network-attached storage (NAS) device 20, e.g., where the NAS device 20 is coupled to the virtualization server computer system 10 through a network.

A NAS device is a computer specialized for providing file storage services to other computers on the network. The operating system and other software on the NAS device 20 provide the functionality of file systems, and access to files, and the management of these functionalities. A NAS device is typically not designed to perform general-purpose computing tasks other than file storage. NAS devices often do not have a keyboard or display, and are instead controlled and configured over the network, sometimes by accessing their network address from a web browser. A general-purpose operating system is usually not needed on a NAS device, and a stripped-down operating system with minimal functionality may be used instead. For example FreeNAS is a Free/open source NAS operating system, which is similar to the FreeBSD operating system but with all functionality not related to data storage stripped out. NAS systems include one or more hard disks, often arranged into logical, redundant storage containers or RAID arrays (redundant arrays of inexpensive/independent disks).

NAS devices provide storage at the file system level. This is often contrasted with SAN (Storage Area Network) devices which provide block-based storage and leave file system concerns on the "client" side. NAS devices use file-based protocols such as NFS (popular on UNIX systems), SMB/CIFS (Server Message Block/Common Internet File System) (used with MS Windows systems), or AFP (used with Apple Macintosh Computers. In the example of FIG. 1, the virtualization server computer system 10 may access the virtual disk image files 51 on the NAS device 20 through a Network File System (NFS) interface 60.

In the example of FIG. 1, the virtual disk image file 51A belongs to the virtual machine 50A, the virtual disk image file 51B belongs to the virtual machine 50B, and the virtual disk image file 51C belongs to the virtual machine 50C. However, in various embodiments each virtual machine 50 may use any number of virtual disk image files 51.

It is often necessary to backup the virtual disk image file(s) 51 used by a virtual machine 50. FIG. 1 illustrates a proxy backup server computer system 30 which executes backup software 100 executable to backup the virtual disk image files 51 from the NAS device 20 to a backup storage device 40, e.g., by creating a backup copy of the virtual disk image files 51 on the backup storage device 40. In some embodiments the backup storage device 40 may be a tape drive (e.g., a device operable to store data on tape cartridges). In other embodiments the backup storage device 40 may be any other type of storage device, such as a disk storage unit (e.g., a device including one or more disk drives), optical storage device (e.g., a device operable to store data on optical media), flash memory storage devices, etc.

Suppose that the virtual disk image file 51B used by the virtual machine 50B needs to be backed up. The backup software 100 may communicate through a virtualization API to cause the virtualization platform to create a snapshot 55 of the virtual disk image file 51B. The backup software 100 may then use the snapshot 55 to create the backup copy of the virtual disk image file 51B. The snapshot effectively represents a point-in-time image of the virtual disk image file. In various embodiments any of various snapshot techniques known in the art may be used to create and maintain the snapshot.

The backup software 100 may use the snapshot 55 to backup the virtual disk image file 51B from the NAS device 20 to the backup storage device 40 without transferring the data of the virtual disk image file 51B through the virtualization server computer system 10. Transferring the virtual disk image file 51B through the virtualization server computer system 10 would require processor and network resources of the virtualization server computer system 10 to be devoted to the backup transfer, which would decrease the operating efficiency of the virtualization server computer system 10. Thus, the proxy backup server computer system 30 acts as a backup proxy to control the process of backing up the virtual disk image files used by the virtualization server computer system 10.

In some embodiments the backup software 100 may communicate with the NAS device 20 to transfer data of the snapshot 55 to the proxy backup server computer system 30, and may communicate with the backup storage device 40 to forward the data of the snapshot 55 to the backup storage device 40. In such an embodiment the proxy backup server computer system 30 effectively acts as an intermediate device through which the data is transferred, as indicated by the arrow 12. In other embodiments the backup software 100 may communicate with the NAS device 20 to cause the NAS device 20 to transfer data of the snapshot 55 to the backup storage device 40 without transferring the data through the proxy backup server computer system 30. For example, depending on the type of backup storage device 40 and how it is coupled to the NAS device 20, the NAS device 20 may or may not be able to transfer data directly to the backup storage device 40.

In addition to creating a backup copy of the virtual disk image file 51B on the backup storage device 40, in some embodiments the backup software 100 may also create mapping information 33 useable to access the plurality of files stored in the virtual disk image file 51B on an individual basis.

For each respective file of the plurality of files, the mapping information 33 may specify a location of the respective file within the virtual disk image file 51B. The mapping information 33 may be stored on the backup storage device 40 together with the copy of the virtual disk image file 51B. As described below, the mapping information 33 may subsequently be used to restore an individual file from the copy of the virtual disk image file 51B without requiring the entire virtual disk image file 51B to be mounted.

In various embodiments, the devices illustrated in FIG. 1 may be coupled to each other via any type of network or combination of networks. For example, the network may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer or device may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 2:
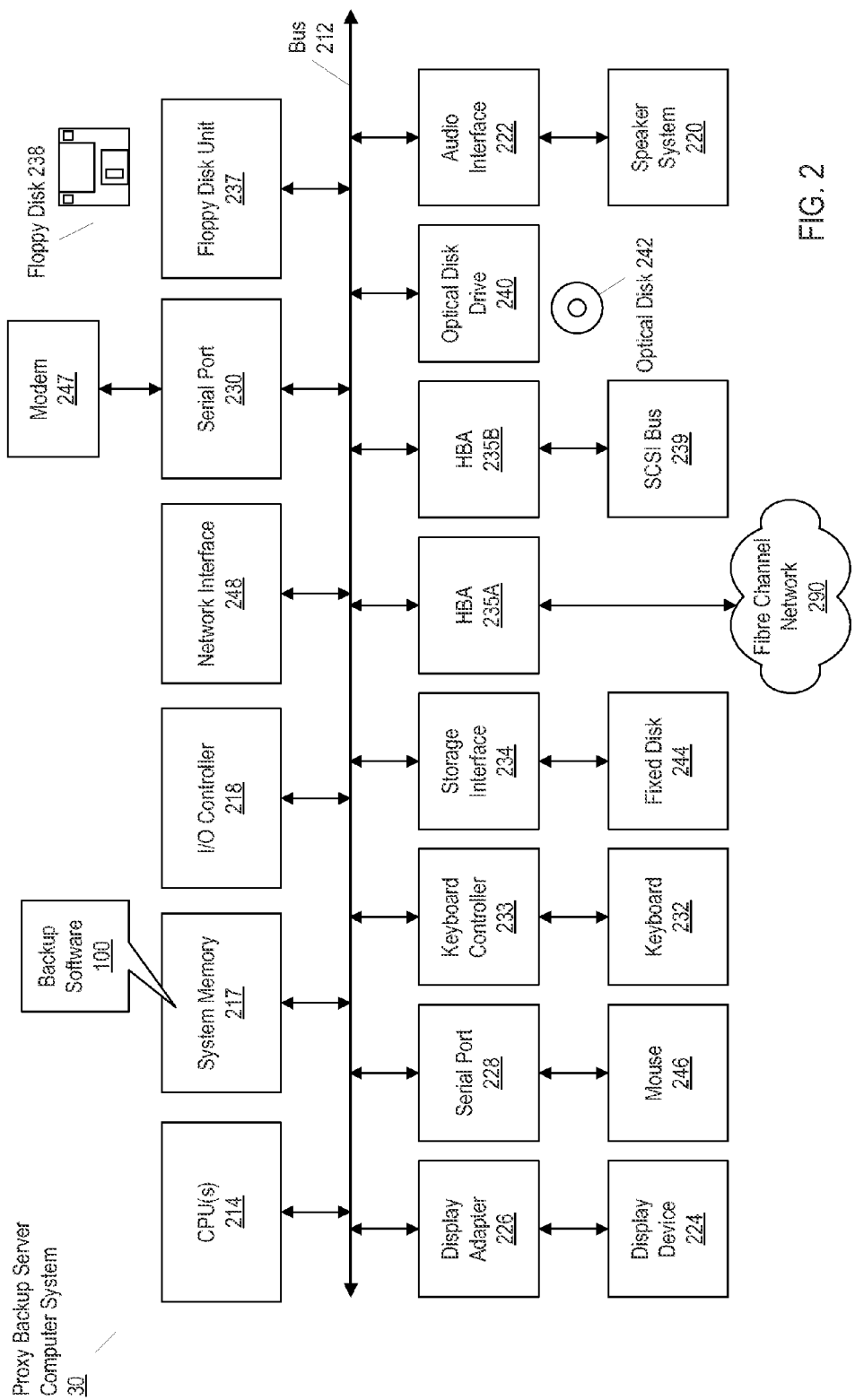
FIG. 2 illustrates a proxy backup server computer system used in the system of FIG. 1.

Referring now to FIG. 2, an example of the proxy backup server computer system 30 according to one embodiment is illustrated. The proxy backup server computer system 30 may include a bus 212 which interconnects major subsystems of the proxy backup server computer system 20, such as one or more central processor units 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

The bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded, including the backup software 100. The ROM or flash memory can contain, among other code, the Basic Input-Output system (BIOS) which controls basic hardware operation such as the interaction with peripheral components. Applications resident with the proxy backup server computer system 30 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of the proxy backup server computer system 30, can connect to a standard computer readable medium for storage and/or retrieval of information, such as a fixed disk drive 244. Fixed disk drive 244 may be a part of proxy backup server computer system 30 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on the proxy backup server computer system 30 may be MS-DOS®, MS-WINDOWS®, OS/2®, UNIX®, Linux®, or another known operating system.

Figure 3:
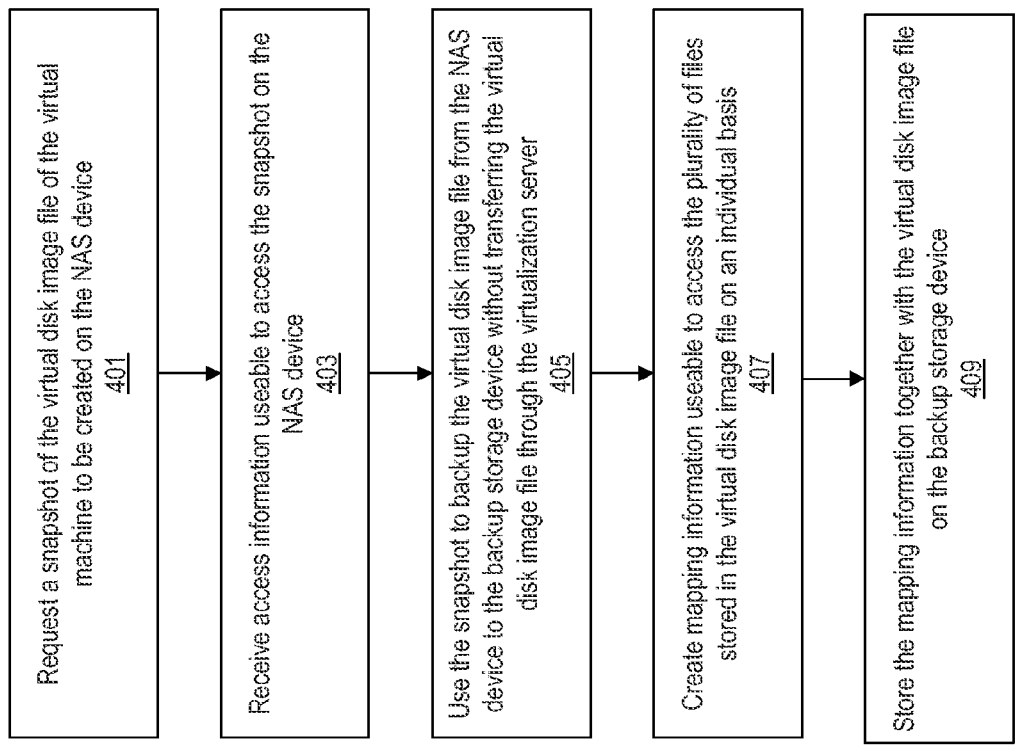
FIG. 3 is a flowchart diagram illustrating one embodiment of a method for creating a backup copy of a virtual disk image file used by a virtual machine.

FIG. 3 is a flowchart diagram illustrating one embodiment of a method for creating a backup copy of a virtual disk image file used by a virtual machine. The method may be implemented by the backup software 100 executing on the proxy backup server computer system 30.

Figure 4:
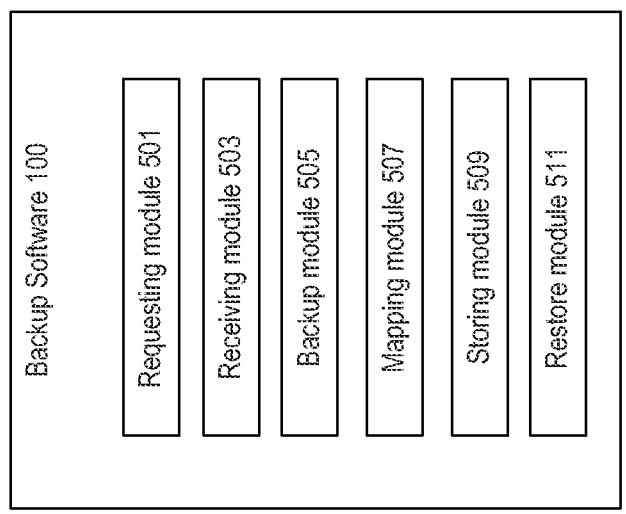
FIG. 4 illustrates backup software executed by the proxy backup server computer system.

As indicated in block 401, the backup software 100 may request a snapshot of the virtual disk image file of the virtual machine to be created on the NAS device 20. As illustrated in FIG. 4, the backup software 100 may include a requesting module 501 which performs the functionality of requesting the snapshot to be created. In some embodiments the requesting module 501 may communicate with the virtualization platform which manages the virtual machine through a service interface provided by the virtualization platform in order to request the virtualization platform to create the snapshot. For example, in the case of a VMWare virtualization platform, the standard VMWare Infrastructure API (VI API) may used to interact with the Virtual Center Server to request a VMware Consolidated Backup (VCB) snapshot of the virtual machine to be created.

As indicated in block 403, the backup software 100 may receive access information useable to access the snapshot on the NAS device 20. As illustrated in FIG. 4, the backup software 100 may include a receiving module 503 which performs the functionality of receiving the access information. In some embodiments the access information may be a pathname of one or more files that were created by the virtualization platform on the NAS device 20 to represent the snapshot.

As indicated in block 405, the backup software 100 may then use the snapshot to backup the virtual disk image file from the NAS device to the backup storage device 40 without transferring the virtual disk image file through the virtualization server computer system 10. As illustrated in FIG. 4, the backup software 100 may include a backup module 505 which performs the functionality of backing up the virtual disk image file using the snapshot. As discussed above, in some embodiments the backup module 505 may transfer the data of the virtual disk image file through the proxy backup server computer system 30, and in other embodiments the backup module 505 may cause the NAS device 20 to send the data of the virtual disk image file directly to the backup storage device 40.

As indicated in block 407, in some embodiments the backup software 100 may also create mapping information useable to access the plurality of files stored in the copy of the virtual disk image file on an individual basis. As illustrated in FIG. 4, the backup software 100 may include a mapping module 507 which performs the functionality of creating the mapping information.

As indicated in block 409, the backup software 100 may store the mapping information together with the copy of the virtual disk image file on the backup storage device 40. As illustrated in FIG. 4, the backup software 100 may include a storing module 509 which performs the functionality of storing the mapping information.

Figure 5:
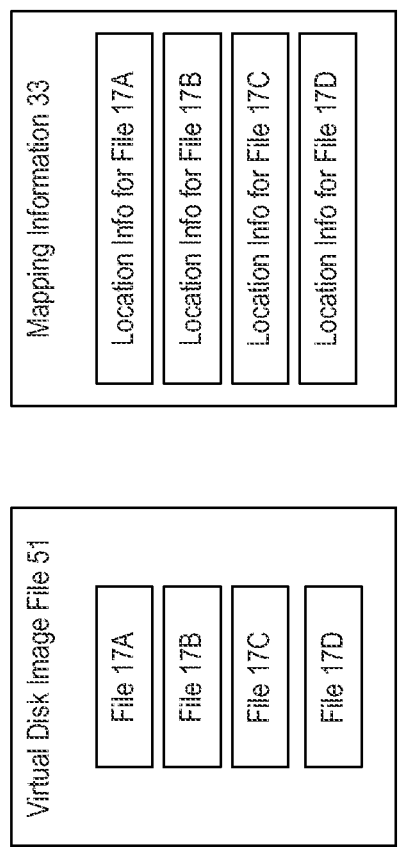
FIG. 5 illustrates a virtual disk image file and mapping information which specifies the location of each of the files in the virtual disk image file.

As illustrated in FIG. 5, the virtual disk image file 51 which is backed up to the backup storage device 40 includes a plurality of files 17. The mapping information 33 includes respective location information which specifies the location of each respective file 17 within the virtual disk image file 51. The mapping information 33 may be created by examining data structures contained in the virtual disk image file 51 in order to determine the location of each file within the virtual disk image file 51. As discussed above, the virtual disk image file represents the contents and structure of a hard disk drive, e.g., by representing disk sectors. Thus, in some embodiments the location information for each file may specify which disk sectors the file's data is stored in.

The mapping information may enable an individual file to be restored from the copy of the virtual disk image file on the backup storage device without requiring the entire virtual disk image file to be mounted. As illustrated in FIG. 4 the backup software 100 may include a restore module 511 which implements the file restore functionality. For example, suppose that after the backup copy of the virtual disk image file has been created, the backup software 100 receives a request to restore a particular file of a plurality of files stored in the virtual disk image file on the backup storage device to a particular computer system. In response to the request to restore the particular file, the restore module 511 may access the mapping information to determine the location information specifying the location of the particular file within the virtual disk image file copy on the backup storage device. The restore module 511 may then extract the particular file from the virtual disk image file on the backup storage device using the location information. For example, as noted above, the location information may specify which disk sectors the file's data is stored in. The restore module may determine the physical locations where these virtual sectors are located on the backup storage device 40 and access these physical locations to extract the file data. The restore module 511 may then transfer the particular file to the computer system which requested the file to be restored.

As noted above, the backup software 100 may utilize a snapshot in backing up a virtual disk image file, e.g., so that the backup copy of the virtual disk image file is a point-in-time representation of the virtual disk image file. The snapshot may be maintained by the virtualization platform while the backup is being performed. Once the backup has been completed, the backup software 100 may notify the virtualization platform that the snapshot can be released. Maintaining the snapshot during the time when the backup is being performed may increase the load on the virtualization server computer system 10 since this requires some overhead if the virtual disk image file is changing during that time.

Figure 6:
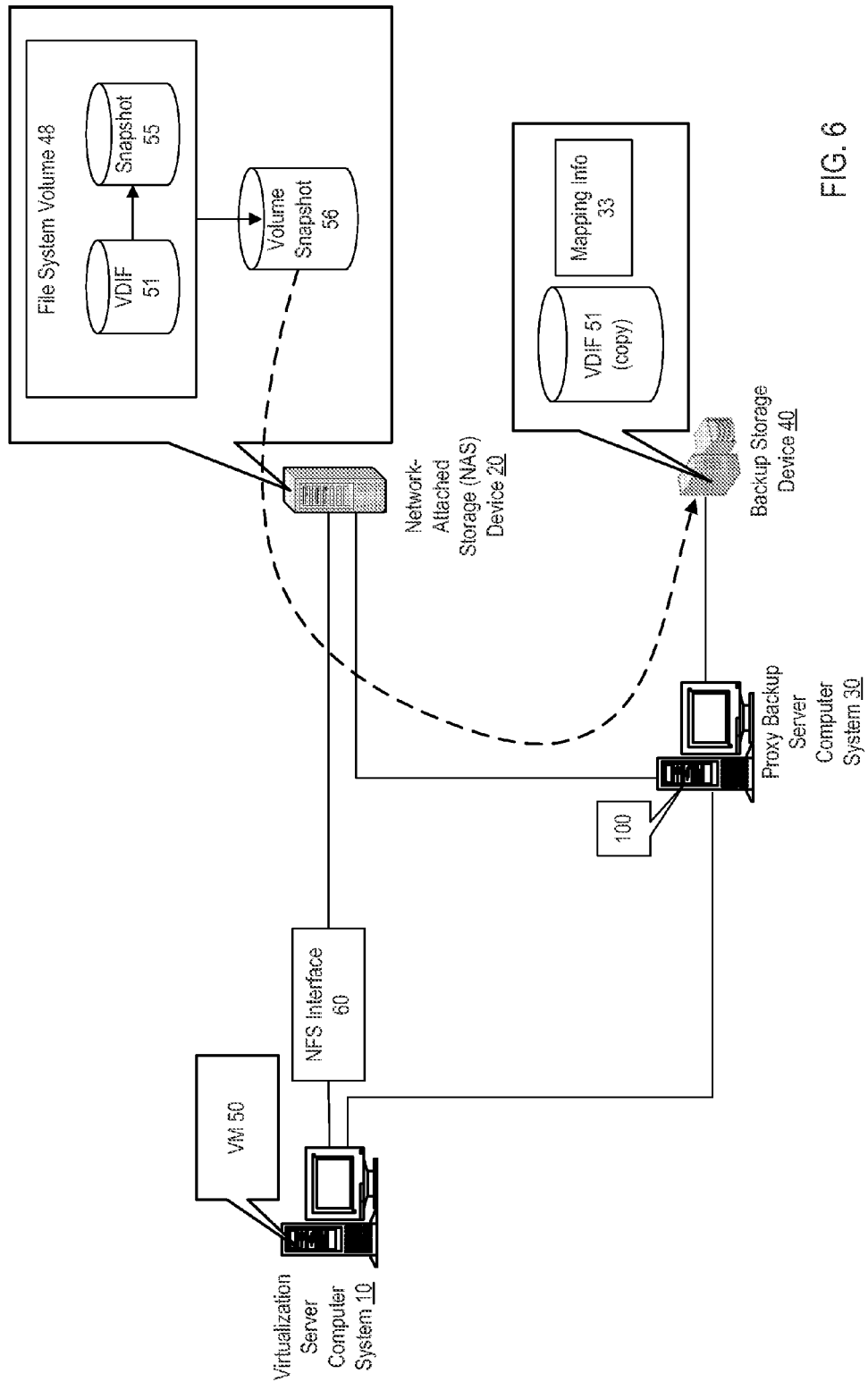
FIG. 6 illustrates an alternative embodiment of a method for creating a backup copy of a virtual disk image file used by a virtual machine.

An alternative embodiment is illustrated in FIG. 6. In this embodiment, the backup software 100 may request the snapshot of the virtual disk image file to be created, similarly as described above. As shown in FIG. 6 the virtual disk image file 51 and the snapshot 55 of the virtual disk image file 51 may be stored in a file system volume 48 on the NAS device. After the virtual disk image file snapshot 55 has been created, the backup software 100 may then request a volume snapshot 57 of the file system volume 48 to be created. The backup software 100 may then inform the virtualization platform that the virtual disk image file snapshot 55 can be released. A copy of the virtual disk image file 51 is then backed up to the backup storage device 40 using the volume snapshot 56. Using a volume snapshot in this manner to backup the virtual disk image file may thus decrease the load on the virtualization server computer system 10 since the virtual disk image file snapshot 55 can be released sooner.

Various embodiments of a method for backing up a virtual disk image file have been described above. The method is implemented by various devices operating in conjunction with each other, and causes a transformation to occur in one or more of the devices. For example, the backup storage device is transformed by storing the backup copy of the virtual disk image file on the backup storage device.

It is noted that various functions described herein may be performed in accordance with cloud-based computing techniques or software as a service (Saas) techniques in some embodiments. For example, in some embodiments the functionality of the backup software 100 may be provided as a cloud computing service.

It is further noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A non-transitory computer-accessible storage medium storing program instructions executable to:

perform a backup of a virtual machine executing on a virtualization server computer by:

requesting a first snapshot of a virtual disk image file of the virtual machine to be created on a network-attached storage (NAS) device coupled to the virtualization server computer, wherein the virtual disk image file stores a plurality of files used by the virtual machine, wherein the virtual disk image file and the first snapshot are stored in a file system volume on the NAS device;

requesting a second snapshot of the file system volume to be created on the NAS device;

after requesting the second snapshot of the file system volume to be created, requesting the first snapshot of the virtual disk image file to be released;

receiving access information useable to access the second snapshot on the NAS device; and using the second snapshot to backup the virtual disk image file from the NAS device to a backup storage device without transferring the virtual disk image file through the virtualization server computer.

2. The computer-accessible storage medium of claim 1, wherein the program instructions are further executable to:

create mapping information useable to access the plurality of files stored in the virtual disk image file on an individual basis, wherein for each respective file of the plurality of files, the mapping information specifies a location of the respective file within the virtual disk image file; and store the mapping information on the backup storage device.

3. The computer-accessible storage medium of claim 2, wherein the program instructions are further executable to:

receive a request to restore a particular file of the plurality of files from the virtual disk image file on the backup storage device to a particular computer system;

in response to the request to restore the particular file, access the mapping information to determine location information specifying the location of the particular file within the virtual disk image file on the backup storage device;

extract the particular file from the virtual disk image file on the backup storage device using the location information; and transfer the particular file to the particular computer system.

4. The computer-accessible storage medium of claim 1, wherein the virtual disk image file is one of:

a Virtual Machine Disk Format (VMDK) file;
a Virtual Hard Disk (VHD) file.

5. The computer-accessible storage medium of claim 1, wherein the program instructions are executable by a particular computer;

wherein the program instructions are executable to:
communicate with the NAS device to transfer data of the second snapshot to the particular computer; and
communicate with the backup storage device to transfer the data of the second snapshot to the backup storage device.

6. The computer-accessible storage medium of claim 1, wherein the program instructions are executable by a particular computer;

wherein the program instructions are executable to:
communicate with the NAS device to cause the NAS device to transfer data of the second snapshot to the backup storage device without transferring the data through the particular computer.

7. A system comprising:
one or more processors; and
memory storing program instructions;
wherein the program instructions are executable by the one or more processors to perform a backup of a virtual machine executing on a virtualization server computer by:

requesting a first snapshot of a virtual disk image file of the virtual machine to be created on a network-attached storage (NAS) device coupled to the virtualization server computer, wherein the virtual disk image file stores a plurality of files used by the virtual machine, wherein the virtual disk image file and the first snapshot are stored in a file system volume on the NAS device;

requesting a second snapshot of the file system volume to be created on the NAS device;

after requesting the second snapshot of the file system volume to be created, requesting the first snapshot of the virtual disk image file to be released;

receiving access information useable to access the second snapshot on the NAS device; and using the second snapshot to backup the virtual disk image file from the NAS device to a backup storage device without transferring the virtual disk image file through the virtualization server computer.

8. The system of claim 7, wherein the program instructions are further executable by the one or more processors to:

create mapping information useable to access the plurality of files stored in the virtual disk image file on an individual basis, wherein for each respective file of the plurality of files, the mapping information specifies a location of the respective file within the virtual disk image file; and store the mapping information on the backup storage device.

9. The system of claim 8, wherein the program instructions are further executable by the one or more processors to:

receive a request to restore a particular file of the plurality of files from the virtual disk image file on the backup storage device to a particular computer system;

in response to the request to restore the particular file, access the mapping information to determine location information specifying the location of the particular file within the virtual disk image file on the backup storage device;

extract the particular file from the virtual disk image file on the backup storage device using the location information; and transfer the particular file to the particular computer system.

10. The system of claim 7,
wherein the virtual disk image file is one of:
a Virtual Machine Disk Format (VMDK) file;
a Virtual Hard Disk (VHD) file.

11. The system of claim 7,
wherein the one or more processors are included in a particular computer;
wherein the program instructions are executable by the one or more processors to:
communicate with the NAS device to transfer data of the second snapshot to the particular computer; and
communicate with the backup storage device to transfer the data of the second snapshot to the backup storage device.

12. The system of claim 7,
wherein the one or more processors are included in a particular computer;

wherein the program instructions are executable by the one or more processors to:
communicate with the NAS device to cause the NAS device to transfer data of the second snapshot to the backup storage device without transferring the data through the particular computer.

13. A method comprising:
executing program instructions on a first computer system to perform a backup of a virtual machine executing on a virtualization server computer, wherein said executing the program instructions causes the first computer system to perform operations including:
requesting a first snapshot of a virtual disk image file of the virtual machine to be created on a network-attached storage (NAS) device coupled to the virtualization server computer, wherein the virtual disk image file stores a plurality of files used by the virtual machine, wherein the virtual disk image file and the first snapshot are stored in a file system volume on the NAS device;
requesting a second snapshot of the file system volume to be created on the NAS device;
after requesting the second snapshot of the file system volume to be created, requesting the first snapshot of the virtual disk image file to be released;
receiving access information useable to access the second snapshot on the NAS device in response to requesting the second snapshot to be created; and
using the second snapshot to backup the virtual disk image file from the NAS device to a backup storage device without transferring the data through the virtualization server computer.

14. The method of claim 13, wherein said executing the program instructions further causes the first computer system to perform additional operations including:
creating mapping information useable to access the plurality of files stored in the virtual disk image file on an individual basis, wherein for each respective file of the plurality of files, the mapping information specifies a location of the respective file within the virtual disk image file; and
storing the mapping information on the backup storage device.

15. The method of claim 14, wherein said executing the program instructions further causes the first computer system to perform additional operations including:
receiving a request to restore a particular file of the plurality of files from the virtual disk image file on the backup storage device to a particular computer system;
in response to the request to restore the particular file, accessing the mapping information to determine location information specifying the location of the particular file within the virtual disk image file on the backup storage device;
extracting the particular file from the virtual disk image file on the backup storage device using the location information; and
transferring the particular file to the particular computer system.

16. The method of claim 13,
wherein the virtual disk image file is one of:
a Virtual Machine Disk Format (VMDK) file;
a Virtual Hard Disk (VHD) file.

* * * * *